United States Patent
Fu (10) Patent No.: US 10,761,639 B2
(45) Date of Patent: Sep. 1, 2020

(54) CHARACTER INPUTTING METHOD AND MOBILE TERMINAL

(71) Applicant: VIVO MOBILE COMMUNICATION CO., LTD., Chang'an Dongguan, Guangdong (CN)

(72) Inventor: Conghua Fu, Chang'an Dongguan (CN)

(73) Assignee: VIVO MOBILE COMMUNCATION CO., LTD., Chang'an, Dongguan (CN)

( * ) Notice: Subject to any disclaimer, the term of this patent is extended or adjusted under 35 U.S.C. 154(b) by 0 days.

(21) Appl. No.: 16/499,031

(22) PCT Filed: Mar. 20, 2018

(86) PCT No.: PCT/CN2018/079582
§ 371 (c)(1),
(2) Date: Sep. 27, 2019

(87) PCT Pub. No.: WO2018/177157
PCT Pub. Date: Oct. 4, 2018

(65) Prior Publication Data
US 2020/0033987 A1    Jan. 30, 2020

(30) Foreign Application Priority Data
Mar. 30, 2017   (CN) .......................... 2017 1 0201832

(51) Int. Cl.
*G06F 3/041*     (2006.01)
*G01L 7/12*      (2006.01)
(Continued)

(52) U.S. Cl.
CPC .............. *G06F 3/0414* (2013.01); *G01L 7/12* (2013.01); *G06F 3/04886* (2013.01); *H04B 1/3827* (2013.01)

(58) Field of Classification Search
CPC ..... G06F 3/0414; G06F 3/04886; G01L 7/12; H04B 1/3827
See application file for complete search history.

(56) References Cited

U.S. PATENT DOCUMENTS 9,939,951 B2   4/2018   Luo et al.
10,222,890 B2  3/2019   Zhang et al.
(Continued)

FOREIGN PATENT DOCUMENTS

CN   102012738 A   4/2011
CN   103197851 A   7/2013
(Continued)

OTHER PUBLICATIONS

Written Opinion and Search Report in Application No. PCT/CN2018/079582 dated Oct. 10, 2019.
(Continued)

*Primary Examiner* — Sejoon Ahn
(74) *Attorney, Agent, or Firm* — Maschoff Brennan (57) ABSTRACT

A character inputting method and a mobile terminal are provided. The method includes: detecting a pressing operation made by a user on a touch panel of the mobile terminal at a display region of the keyboard when a keyboard for inputting characters is displayed on a display panel of a mobile terminal; acquiring a pressure detection value for the pressing operation and a target key on which the pressing operation is performed when the pressing operation has been detected; selecting one character from first-type characters corresponding to the target key and inputting the selected character into a predetermined word editable region when the pressure detection value is greater than a predetermined threshold; and selecting one character from second-type characters corresponding to the target key and inputting the selected character into the predetermined word editable
(Continued)

region when the pressure detection value is smaller than or equal to the predetermined threshold.

6 Claims, 5 Drawing Sheets

(51) Int. Cl.
*G06F 3/0488* (2013.01)
*H04B 1/3827* (2015.01)

(56) References Cited

U.S. PATENT DOCUMENTS

| | | | |
|---|---|---|---|
| 10,268,310 B2 | 4/2019 | Zhang et al. | |
| 10,268,370 B2* | 4/2019 | Chung | G06F 3/0237 |
| 10,275,066 B2 | 4/2019 | Yamano et al. | |
| 10,671,213 B1* | 6/2020 | Smith | G06F 3/04815 |
| 10,671,279 B2* | 6/2020 | Plank | G06F 3/04886 |
| 10,684,774 B2* | 6/2020 | Alfut | G06F 3/04886 |
| 2002/0002069 A1* | 1/2002 | Keronen | G06F 3/0238 |
| | | | 463/1 |
| 2002/0011993 A1* | 1/2002 | Lui | G06F 3/04883 |
| | | | 345/179 |
| 2002/0149569 A1* | 10/2002 | Dutta | G06F 3/0238 |
| | | | 345/173 |
| 2011/0057903 A1 | 3/2011 | Yamano et al. | |
| 2016/0274728 A1 | 9/2016 | Luo et al. | |
| 2017/0269753 A1 | 9/2017 | Zhang et al. | |

FOREIGN PATENT DOCUMENTS

| | | |
|---|---|---|
| CN | 103777769 A | 5/2014 |
| CN | 104915140 A | 9/2015 |
| CN | 105183356 A | 12/2015 |
| CN | 105677204 A | 6/2016 |
| CN | 105824471 A | 8/2016 |
| CN | 105892888 A | 8/2016 |
| CN | 105930085 A | 9/2016 |
| CN | 105988695 A | 10/2016 |
| CN | 106095325 A | 11/2016 |
| CN | 106168880 A | 11/2016 |
| CN | 106406738 A | 2/2017 |
| CN | 106775430 A | 5/2017 |
| WO | 2015/088263 A1 | 6/2015 |

OTHER PUBLICATIONS

European Search Report in Application No. 18778091.1 dated Jan. 15, 2020.
CN Office Action in Application No. 201710201832.3 dated Apr. 16, 2018.
CN Search Report in Application No. 201710201832.3 dated Nov. 8, 2017.

* cited by examiner

| | 1<br>@ - _ / | 2<br>ABC | 3<br>DEF | ⌫ |
|---|---|---|---|---|
| ° | 4<br>GHI | 5<br>JKL | 6<br>MNO | enter |
| ! | 7<br>PQRS | 8<br>TUV | 9<br>WXYZ | 123 |
| symbol | 0 | space | word segment | CN/EN |

CHARACTER INPUTTING METHOD AND MOBILE TERMINAL

CROSS-REFERENCE TO RELATED APPLICATION

The present application is the U.S. national phase of PCT Application No. PCT/CN2018/079582 filed on Mar. 20, 2018, which claims priority of the Chinese patent application No. 201710201832.3 filed on Mar. 30, 2017, which is incorporated herein by reference in its entirety.

TECHNICAL FIELD

The present disclosure relates to the field of communication technology, in particular to a character inputting method and a mobile terminal.

BACKGROUND

For mobile terminals such as mobile phones or tablet computers, words are inputted using an input method performed on a touch panel. Usually, when English letters are inputted using the input method at a full keyboard interface, it is necessary to switch the case of each to-be-inputted letter according to the practical need. For conventional input methods, the case of the letter is mainly switched in the following two modes.

In a first mode, whether an uppercase format is to be adopted to input the letter is selected in accordance with the Shift key. When the Shift key has been selected, an uppercase letter is to be inputted, and otherwise, a lowercase letter is to be inputted.

In a second mode, when inputting the letter, whether the uppercase or lowercase letter is to be inputted is determined through a rapid clicking operation or a pressing and holding operation. When a keyboard is clicked rapidly, the lowercase letter is to be inputted, and when the keyboard is pressed and held, the uppercase letter is to be inputted.

However, in the first mode, it is necessary to select the Shift key before inputting the uppercase letters, i.e., an additional operation needs to be performed as compared with a situation where the lowercase letters are inputted, resulting in a time-consuming, complex and less-efficient operation. In the second mode, it is necessary to press and hold the keyboard when inputting the uppercase letters, resulting in a time-consuming and less-efficient operation as compared with a situation where the lowercase letters are inputted through rapid clicking.

In a word, for the conventional character input methods, there are such problems as being time-consuming, complex and less-efficient when some characters are inputted.

SUMMARY

An object of the present disclosure is to provide a character inputting method and a mobile terminal, so as to solve such problems as being time-consuming, complex and less-efficient occur in the conventional input methods when some characters are inputted.

In one aspect, the present disclosure provides in some embodiments a character inputting method, including: detecting a pressing operation made by a user on a touch panel of a mobile terminal at a display region of a keyboard when the keyboard for inputting characters is displayed on the display panel of the mobile terminal; acquiring a pressure detection value for the pressing operation and a target key on which the pressing operation is performed when the pressing operation has been detected, characters corresponding to the target key comprising first-type characters and second-type characters, and each of the first-type characters and the second-type characters comprising at least one character; selecting one character from the first-type characters corresponding to the target key and inputting the selected character into a predetermined word editable region when the pressure detection value is greater than a predetermined threshold; and selecting one character from the second-type characters corresponding to the target key and inputting the selected character into the predetermined word editable region when the pressure detection value is smaller than or equal to the predetermined threshold.

In another aspect, the present disclosure provides in some embodiments a mobile terminal, including: an operation detection module configured to, when a keyboard for inputting characters is displayed on a display panel of a mobile terminal, detect a pressing operation made by a user on a touch panel of the mobile terminal at a display region of the keyboard; an information acquisition module configured to, when the pressing operation has been detected, acquire a pressure detection value for the pressing operation and a target key on which the pressing operation is performed, characters corresponding to the target key including first-type characters and second-type characters, and each of the first-type characters and the second-type characters including at least one character; a first input module configured to, when the pressure detection value is greater than a predetermined threshold, select one character from the first-type characters corresponding to the target key and input the selected character into a predetermined word editable region; and a second input module configured to, when the pressure detection value is smaller than or equal to the predetermined threshold, select one character from the second-type characters corresponding to the target key and input the selected character into the predetermined word editable region.

In yet another aspect, the present disclosure provides in some embodiments a mobile terminal, including a memory, a processor, and a computer program stored in the memory and executed by the processor. The processor is configured to execute the computer program so as to implement the above-mentioned character inputting method.

According to the embodiments of the present disclosure, when the keyboard for inputting the characters is displayed on the display panel of the mobile terminal, the pressing operation made by the user on the touch panel of the mobile terminal at the display region of the keyboard may be detected. When the pressing operation has been detected, the pressure detection value for the pressing operation and the target key on which the pressing operation is performed may be acquired. When the pressure detection value is greater than the predetermined threshold, one character may be selected from the first-type characters corresponding to the target key and then inputted into the predetermined word editable region. When the pressure detection value is smaller than or equal to the predetermined threshold, one character may be selected from the second-type characters corresponding to the target key and then inputted into the predetermined word editable region. In the embodiments of the present disclosure, the type of characters corresponding to the target key may be determined by the user through changing a pressure for the pressing operation made on the touch panel of the mobile terminal. Regardless of the pressure for the pressing operation, the pressing operation may be performed rapidly. In addition, when it is necessary to switch the types of the characters, it is merely necessary to change the pressure for the pressing operation, without any other additional operation. As a result, it is able to solve such problems as being time-consuming, complex and less-efficient occur in the conventional input methods when some characters are inputted, thereby to input the characters efficiently.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
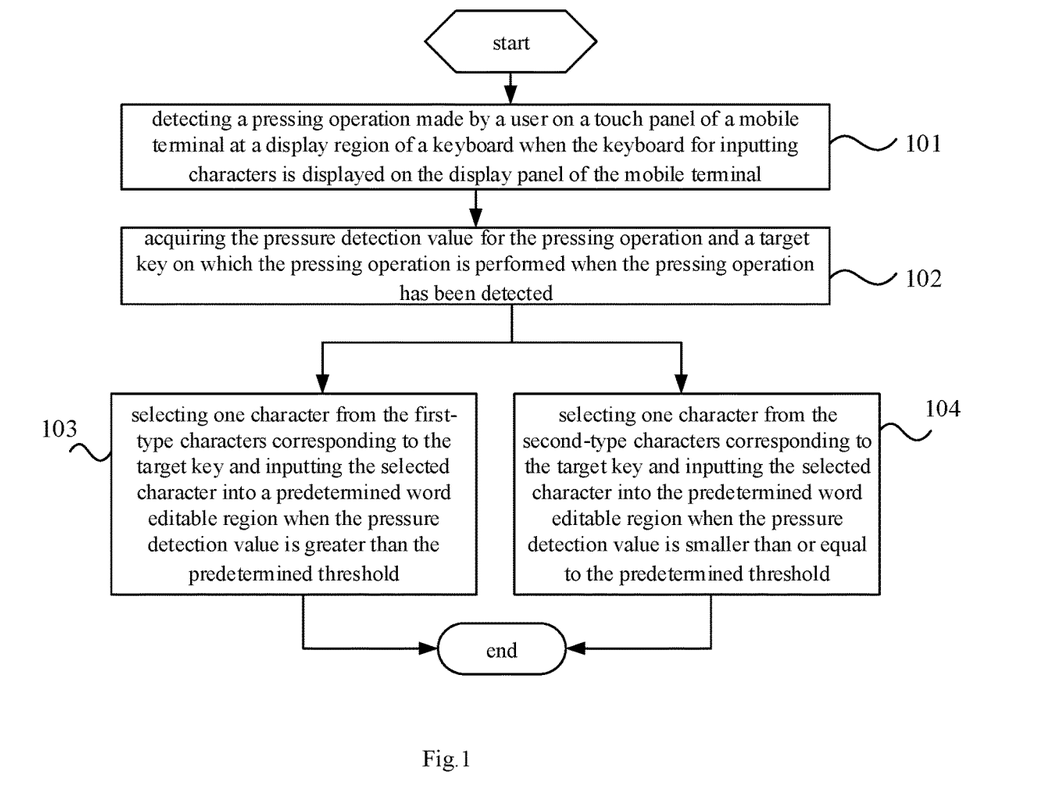
FIG. 1 is a flow chart of a character inputting method according to one embodiment of the present disclosure.

The present disclosure provides in some embodiments a character inputting method which, as shown in FIG. 1, includes the following steps.

Step 101: detecting a pressing operation made by a user on a touch panel of a mobile terminal at a display region of a keyboard when the keyboard for inputting characters is displayed on a display panel of the mobile terminal.

In the embodiments of the present disclosure, the mobile terminal may include the touch panel and the display panel below the touch panel. The display panel is configured to display the keyboard, i.e., a virtual keyboard, and display word information which has been inputted. The touch panel is configured to detect a touch operation made by the user, and return coordinate information about a touch point.

The pressing operation may include a heavy pressing operation where a pressure detection value is greater than a predetermined threshold and a light pressing operation where the pressure detection value is smaller than or equal to the predetermined threshold.

Step 102: acquiring the pressure detection value for the pressing operation and a target key on which the pressing operation is performed when the pressing operation has been detected.

Characters corresponding to the target key may include first-type characters and second-type characters, and each of the first-type characters and the second-type characters may include at least one character. The characters corresponding to the target key may include all characters capable of being inputted at a predetermined word editable region when the target key is operated by the user.

In addition, the keyboard may be displayed in a full-keyboard display mode, a nine-key Pinyin display mode, a stroke display mode, or a handwritten-keyboard display mode. Regardless of the keyboard display mode, the target key may be a character key, i.e., a key through which a character is capable of being inputted.

In different keyboard display modes, the characters corresponding to the target key may be different. For example, when the keyboard is displayed in the full-keyboard display mode, the characters corresponding to the target key may include uppercase letters, lowercase letters, and numbers. At this time, uppercase characters may be set as the first-type characters, and lowercase characters may be set as the second-type characters. In the embodiments of the present disclosure, the user may switch between the uppercase letters and the lowercase letters through changing a pressure for the pressing operation.

In addition, the touch panel is configured to detect the touch operation made by the user and return the coordinate information about the touch point. When the pressing operation is made by the user on the touch panel of the mobile terminal, the touch panel may be touched by the user, so the target key corresponding to the pressing operation may be determined in accordance with the coordinate information about the touch point returned by the touch panel.

Step 103: selecting one character from the first-type characters corresponding to the target key and inputting the selected character into a predetermined word editable region when the pressure detection value is greater than the predetermined threshold.

When the pressure detection value is greater than the predetermined threshold, it means that the pressing operation is the heavy pressing operation. In the embodiments of the present disclosure, the first-type characters in the characters corresponding to the target key may be preconfigured to the heavy pressing operation. When the pressing operation made by the user is the heavy pressing operation, one character of the first-type characters corresponding to the target key may be inputted into the predetermined word editable region. For example, when the first-type character is an uppercase letter A and the heavy pressing operation is made by the user on the target key, the uppercase letter A may be inputted into the predetermined word editable region.

Step 104: selecting one character from the second-type characters corresponding to the target key and inputting the selected character into the predetermined word editable region when the pressure detection value is smaller than or equal to the predetermined threshold.

When the pressure detection value is smaller than or equal to the predetermined threshold, it means that the pressing operation is the light pressing operation. In the embodiments of the present disclosure, the second-type characters in the characters corresponding to the target key may be preconfigured to the light pressing operation. When the pressing operation made by the user is the light pressing operation, one character of the second-type characters corresponding to the target key may be inputted into the predetermined word editable region. For example, when the second-type character is a lowercase letter a and the light pressing operation is made by the user on the target key, the lowercase letter a may be inputted into the predetermined word editable region.

According to the embodiments of the present disclosure, when the keyboard for inputting the characters is displayed on the display panel of the mobile terminal, the pressing operation made by the user on the touch panel of the mobile terminal at the display region of the keyboard may be detected. When the pressing operation has been detected, the pressure detection value for the pressing operation and the target key on which the pressing operation is performed may be acquired. When the pressure detection value is greater than the predetermined threshold, one character may be selected from the first-type characters corresponding to the target key and then inputted into the predetermined word editable region. When the pressure detection value is smaller than or equal to the predetermined threshold, one character may be selected from the second-type characters corresponding to the target key and then inputted into the predetermined word editable region. In the embodiments of the present disclosure, the type of characters corresponding to the target key may be determined by the user through changing a pressure for the pressing operation made on the touch panel of the mobile terminal. Regardless of the pressure for the pressing operation, the pressing operation may be performed rapidly. In addition, when it is necessary to switch the types of the characters, it is merely necessary to change the pressure for the pressing operation, without any other additional operation. As a result, it is able to solve such problems as being time-consuming, complex and less-efficient occur in the conventional input methods when some characters are inputted, thereby to input the characters efficiently.

Figure 2:
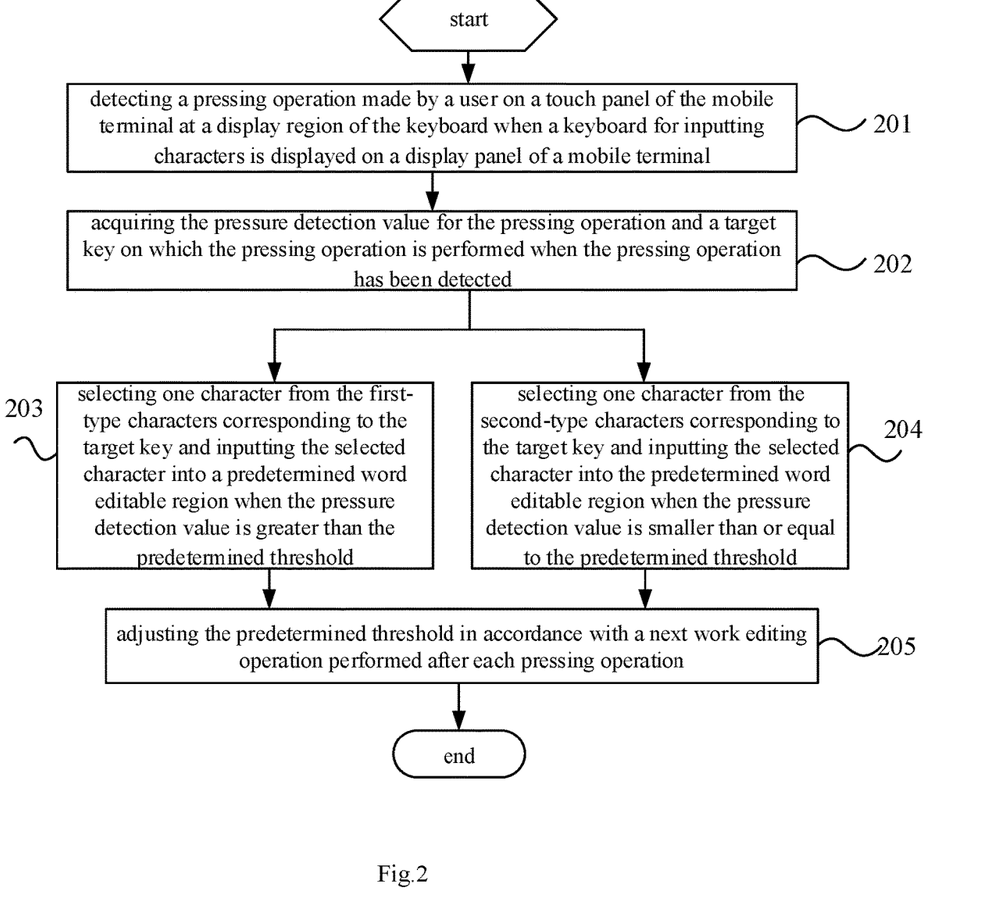
FIG. 2 is another flow chart of the character inputting method according to one embodiment of the present disclosure.

The present disclosure further provides in some embodiments a character inputting method which, as shown in FIG. 2, includes the following steps.

Step 201: detecting a pressing operation made by a user on a touch panel of a mobile terminal at a display region of a keyboard when the keyboard for inputting characters is displayed on a display panel of the mobile terminal.

In the embodiments of the present disclosure, the mobile terminal may include the touch panel and the display panel below the touch panel. The display panel is configured to display the keyboard, i.e., a virtual keyboard, and display word information which has been inputted. The touch panel is configured to detect a touch operation made by the user, and return coordinate information about a touch point.

The pressing operation may include a heavy pressing operation where a pressure detection value is greater than a predetermined threshold and a light pressing operation where the pressure detection value is smaller than or equal to the predetermined threshold.

Step 202: acquiring the pressure detection value for the pressing operation and a target key on which the pressing operation is performed when the pressing operation has been detected.

Characters corresponding to the target key may include first-type characters and second-type characters, and each of the first-type characters and the second-type characters may include at least one character. The characters corresponding to the target key may include all characters capable of being inputted at a predetermined word editable region when the target key is operated by the user.

In addition, the keyboard may be displayed in a full-keyboard display mode, a nine-key Pinyin display mode, a stroke display mode, or a handwritten-keyboard display mode. Regardless of the keyboard display mode, the target key may be a character key, i.e., a key through which a character is capable of being inputted.

In different keyboard display modes, the characters corresponding to the target key may be different. For example, when the keyboard is displayed in the full-keyboard display mode, the to-be-inputted characters corresponding to the target key may include uppercase letters, lowercase letters, and numbers. At this time, uppercase characters may be set as the first-type characters, and lowercase characters may be set as the second-type characters. In the embodiments of the present disclosure, the user may switch between the uppercase letters and the lowercase letters through changing a pressure for the pressing operation.

In a possible embodiment of the present disclosure, when the touch panel is a pressure-sensitive touch panel, the acquiring the pressure detection value for the pressing operation may include acquiring the pressure detection value for the pressing operation detected by the pressure-sensitive touch panel.

Figure 3:
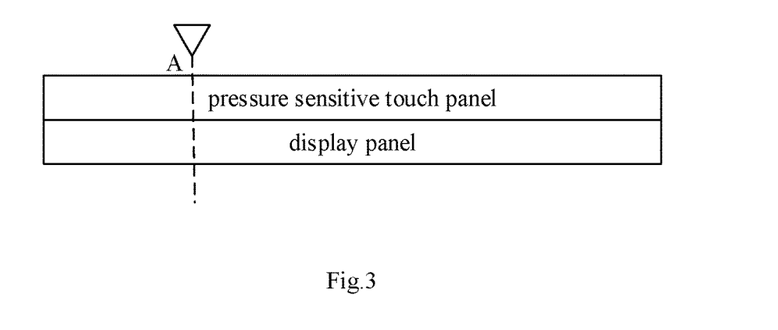
FIG. 3 is a schematic view showing a principle of acquiring a pressure detection value for a pressing operation according to one embodiment of the present disclosure.

The pressure-sensitive touch panel may include a sensor for detecting a pressure. In other words, the pressure-sensitive touch panel may sense the pressure for the pressing operation made by the user on the touch panel using a pressure-sensitive touch technique. As shown in FIG. 3, when the pressing operation is made by the user at a point A on the touch panel, the pressure-sensitive touch panel may detect the pressure detection value for the pressing operation.

In a possible embodiment of the present disclosure, when the mobile terminal is provided with a barometer arranged below the touch panel, the acquiring the pressure detection value for the pressing operation may include: acquiring a first atmospheric pressure value in an internal cavity of the mobile terminal detected by the barometer before the touch panel is pressed, and a second atmospheric pressure value in the internal cavity of the mobile terminal detected by the barometer when the touch panel is being pressed; and calculating a difference between the second atmospheric pressure value and the first atmospheric pressure value, and taking the difference as the pressure detection value for the pressing operation.

In other words, for the mobile terminal provided with the barometer, a value of an atmospheric pressure in the internal cavity of the mobile terminal may be affected by a value of the pressure applied by the user to the touch panel, so it is able to represent the pressure detection value for the pressing operation through the difference of the atmospheric pressure values detected by the barometer.

Figure 4:
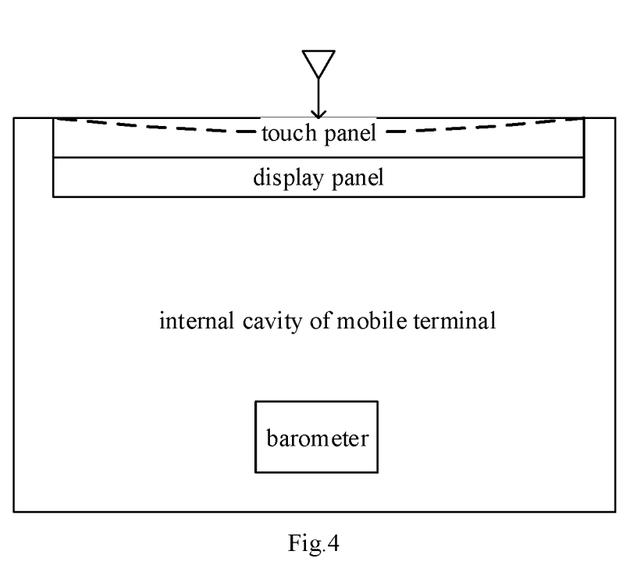
FIG. 4 is another schematic view showing the principle of acquiring the pressure detection value for the pressing operation according to one embodiment of the present disclosure.
Figure 5:
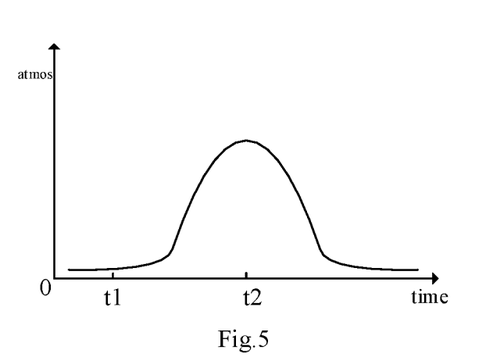
FIG. 5 shows an atmospheric pressure-time curve acquired by a barometer inside a mobile terminal according to one embodiment of the present disclosure.

The barometer may be provided with a ventilation device (a hole). Through the ventilation device, air in the internal cavity of the mobile terminal may communicate with an external environment, so the atmospheric pressure in the internal cavity of the mobile terminal may be the same as an atmospheric pressure in the external environment. As shown in FIG. 5, t1 represents a time point before the pressing operation is made by the user on the touch panel of the mobile terminal, and t2 represents a time point when the pressing operation is made by the user on the touch panel of the mobile terminal. As shown in FIG. 4, when the touch panel is pressed by the user, the touch panel may be deformed (a profile of the deformed touch panel is defined by a dotted line), so the air in the internal cavity of the mobile terminal may be compressed rapidly and an instantaneous peak value may be generated by the barometer. Then, due to the hole, the atmospheric pressure in the internal cavity of the mobile terminal may be the same as that in the external environment. In other words, the atmospheric pressure value detected by the barometer cannot be maintained continuously. Hence, in the embodiments of the present disclosure, the pressure detection value for the pressing operation may be represented by the difference between the first atmospheric pressure value detected by the barometer before the touch panel is pressed and the second atmospheric pressure value detected by the barometer when the touch panel is being pressed.

The pressure for the pressing operation may be detected in various modes, so the acquired pressure detection values may be different physical quantities, and the corresponding predetermined thresholds may also be different physical quantities. In other words, the pressure detection value and the predetermined threshold may belong to a same physical quantity. For example, when the pressure for the pressing operation is detected by the barometer inside the mobile terminal, the pressure detection value and the predetermined threshold may each be the atmospheric pressure in Pa.

In addition, the touch panel is configured to detect the touch operation made by the user and return the coordinate information about the touch point. When the pressing operation is made by the user on the touch panel of the mobile terminal, the touch panel may be touched by the user, so the target key corresponding to the pressing operation may be determined in accordance with the coordinate information about the touch point returned by the touch panel.

Step 203: selecting one character from the first-type characters corresponding to the target key and inputting the selected character into a predetermined word editable region when the pressure detection value is greater than the predetermined threshold.

When the pressure detection value is greater than the predetermined threshold, it means that the pressing operation is the heavy pressing operation. In the embodiments of the present disclosure, the first-type characters in the characters corresponding to the target key may be preconfigured to the heavy pressing operation. When the pressing operation made by the user is the heavy pressing operation, one character of the first-type characters corresponding to the target key may be inputted into the predetermined word editable region. For example, when the first-type character is an uppercase letter A and the heavy pressing operation is made by the user on the target key, the uppercase letter A may be inputted into the predetermined word editable region.

In a possible embodiment of the present disclosure, when the first-type characters include more than one character, the selecting one character from the first-type characters corresponding to the target key and inputting the selected character into the predetermined word editable region may include displaying the characters included in the first-type characters at a first predetermined region, and inputting a character selected by the user at the first predetermined region into the predetermined word editable region. In this way, the user may be aware of the characters included in the first-type characters, so as to facilitate the selection of the character to be inputted into the predetermined word editable region from the characters included in the first-type characters.

Figure 6:
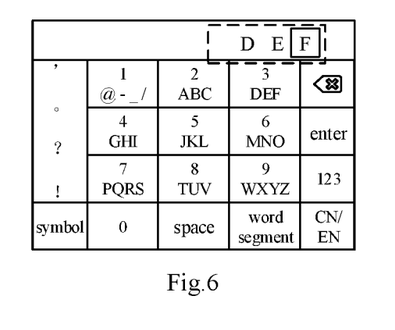
FIG. 6 is a schematic view showing a situation where first-type characters are displayed at a first predetermined region according to one embodiment of the present disclosure.

For example, as shown in FIG. 6, characters corresponding to a certain target key include "3, D, E and F", and "D, E and F" belong to the first-type characters, and "3" belongs to the second-type character. At this time, when the pressure detection value for the pressing operation made by the user on the target key is greater than the predetermined threshold, the characters "D, E and F" may be displayed at the first predetermined region (i.e., a region defined by the dotted line). When a character "F" is selected by the user from the three characters, the character "F" may be inputted into the predetermined word editable region.

Step 204: selecting one character from the second-type characters corresponding to the target key and inputting the selected character into the predetermined word editable region when the pressure detection value is smaller than or equal to the predetermined threshold.

When the pressure detection value is smaller than or equal to the predetermined threshold, it means that the pressing operation is the light pressing operation. In the embodiments of the present disclosure, the second-type characters in the characters corresponding to the target key may be preconfigured to the light pressing operation. When the pressing operation made by the user is the light pressing operation, one character of the second-type characters corresponding to the target key may be inputted into the predetermined word editable region. For example, when the second-type character is a number "3" and the light pressing operation is made by the user on the target key, the number "3" may be inputted into the predetermined word editable region.

In a possible embodiment of the present disclosure, when the second-type characters include more than one character, the selecting one character from the second-type characters corresponding to the target key and inputting the selected character into the predetermined word editable region may include displaying the characters included in the second-type characters at a second predetermined region, and inputting a character selected by the user at the second predetermined region into the predetermined word editable region. In this way, the user may be aware of the characters included in the second-type characters, so as to facilitate the selection of the character to be inputted into the predetermined word editable region from the characters included in the second-type characters.

Step 205: adjusting the predetermined threshold in accordance with a next word editing operation performed after each pressing operation.

Different users may have different using habits, and even for a same mobile terminal, different pressures may be applied each time by a same user for the light pressing operation and the heavy pressing operation. In addition, for different mobile terminals, even the mobile terminals of a same type, the pressure detection values acquired for the pressing operations made at a same pressure may also be different from each other. Furthermore, for the same mobile terminal, along with an increase in the times of uses as well as the service time, the components of the mobile terminal may be aged gradually, so the pressure detection values acquired for the pressing operations made at a same pressure may also be different from each other. Due to the above factors, the pressing operation may be identified erroneously. For example, when the user needs to input an uppercase letter "A", the pressure for the pressing operation may probably be determined as a light pressing operation, and at this time a lowercase letter "a" may be inputted.

In order to prevent the occurrence of erroneous identification, in the embodiments of the present disclosure, after a character corresponding to a certain pressing operation has been inputted into the predetermined word editable region, the next word editing operation performed after the pressing operation may be detected, so as to determine whether the pressing operation has been erroneously identified.

In a possible embodiment of the present disclosure, Step 205 may include: determining whether the next word editing operation performed after each pressing operation is a cancelling operation; when the next word editing operation performed after each pressing operation is the cancelling operation, recording the pressure detection value for the pressing operation, and determining an average of the recorded pressure detection values as an adjusted threshold when the times of recording the pressure detection values reach a predetermined value; and when the next word editing operation performed after each pressing operation is not the cancelling operation, maintaining the predetermined threshold.

In other words, after a character corresponding to a certain pressing operation has been inputted into the predetermined word editable region, when the cancelling operation is performed on the character, it means that the pressing operation has been identified erroneously. When the times of erroneously identifying the pressing operations reach the predetermined value, the predetermined threshold may be adjusted in accordance with the pressure detection values of these pressing operations. In this way, it is able to further reduce the probability of erroneously inputting the undesired character into the predetermined word editable region when the pressing operation is erroneously identified as the heavy pressing operation or the light pressing operation.

The predetermined threshold may be adjusted in accordance with a pressure detection value for a pressing operation when the pressing operation has been erroneously identified each time (i.e., when the next pressing operation performed after the pressing operation is the cancelling operation). Also, the predetermined threshold may be adjusted in accordance with pressure detection values for a plurality of pressing operations when these pressing operations have been erroneously identified.

In addition, apart from an averaging method (i.e., setting the average of the pressure detection values for the pressing operations that have been erroneously identified as the adjusted threshold), the predetermined threshold may also be adjusted using an iterating method (i.e., a pressure detection value of a certain pressing operation may be determined as the adjusted threshold as long as the pressing operation has been erroneously identified). An optimization effect may be affected differently due to different algorithms.

To be specific, for example, when the uppercase letter "A" is erroneously inputted by the user as the lowercase letter "a", a next operation with a maximum probability may include pressing a key "space" or "delete". As a typical correcting operation, in the embodiments of the present disclosure, when such a continuous inputting action as "a"+"space" or "a"+"delete" has been detected, it means that the letter to be actually inputted by the user may be "A" rather than "a", and a previous pressing operation has been erroneously identified. When a current predetermined threshold is P0 (i.e., when the pressure is greater than P0, the pressing operation may be determined as the heavy pressing operation, and otherwise the pressing operation may be determined as the light pressing operation), it is necessary to optimize the predetermined threshold in accordance with P0 and a pressure detection value P1 for the pressing operation which has been erroneously identified, and a new threshold may be set as P0'. The specific optimization may be implemented through conventional algorithms, e.g., the iterating method in which P0 is directly replaced by P1 (i.e., P0'=P1), or the averaging method in which an average of P1 and P0 is acquired (i.e., P0'=(P0+P1)/2).

In addition, in a possible embodiment of the present disclosure, after the pressing operation has been made by the user and before a finger of the user moves away from the touch panel, a character displayed at a predetermined region of the display panel (e.g., a region adjacent to the target key corresponding to the pressing operation) may be changed in real time in accordance with a change in the detected pressure detection value for the pressing operation. For example, the first-type character corresponding to a key A may be the uppercase letter "A", and the second-type character may be the lowercase letter "a". When the key A is being pressed by the user and the pressure increases gradually, the letter display adjacent to the target key may be "a" at the beginning, and when the pressure detection value is greater than the predetermined threshold, the displayed letter may change from "a" to "A".

In the embodiments of the present disclosure, when the keyboard for inputting the characters is displayed on the display panel of the mobile terminal, the pressing operation made by the user on the touch panel of the mobile terminal at the display region of the keyboard may be detected. When the pressing operation has been detected, the pressure detection value for the pressing operation and the target key on which the pressing operation is performed may be acquired. When the pressure detection value is greater than the predetermined threshold, one character may be selected from the first-type characters corresponding to the target key and then inputted into the predetermined word editable region. When the pressure detection value is smaller than or equal to the predetermined threshold, one character may be selected from the second-type characters corresponding to the target key and then inputted into the predetermined word editable region. In addition, the predetermined threshold may be adjusted in accordance with the next word editing operation performed after the pressing operation.

In the embodiments of the present disclosure, the type of characters corresponding to the target key may be determined by the user through changing a pressure for the pressing operation made on the touch panel of the mobile terminal. Regardless of the pressure for the pressing operation, the pressing operation may be performed rapidly. In addition, when it is necessary to switch the types of the characters, it is merely necessary to change the pressure for the pressing operation, without any other additional operation. As a result, it is able to solve such problems as being time-consuming, complex and less-efficient occur in the conventional input methods when some characters are inputted, thereby to input the characters efficiently. In addition, through adjusting the predetermined threshold, it is able to input the character accurately and efficiently, thereby to improve the user experience.

Figure 7:
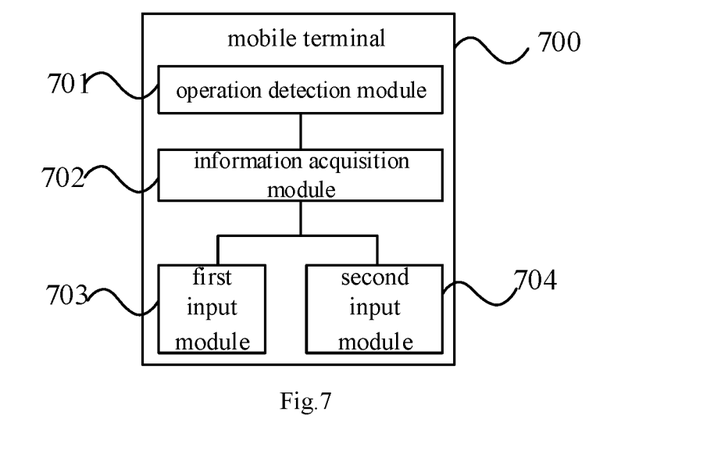
FIG. 7 is a block diagram of the mobile terminal according to one embodiment of the present disclosure.

The present disclosure further provides in some embodiments a mobile terminal 700 which, as shown in FIG. 7, includes: an operation detection module 701 configured to, when a keyboard for inputting characters is displayed on a display panel of a mobile terminal, detect a pressing operation made by a user on a touch panel of the mobile terminal at a display region of the keyboard; an information acquisition module 702 configured to, when the pressing operation has been detected by the operation detection module 701, acquire a pressure detection value for the pressing operation and a target key on which the pressing operation is performed, characters corresponding to the target key including first-type characters and second-type characters, and each of the first-type characters and the second-type characters including at least one character; a first input module 703 configured to, when the pressure detection value acquired by the information acquisition module 702 is greater than a predetermined threshold, select one character from the first-type characters corresponding to the target key and input the selected character into a predetermined word editable region; and a second input module 704 configured to, when the pressure detection value acquired by the information acquisition module 702 is smaller than or equal to the predetermined threshold, select one character from the second-type characters corresponding to the target key and input the selected character into the predetermined word editable region.

Figure 8:
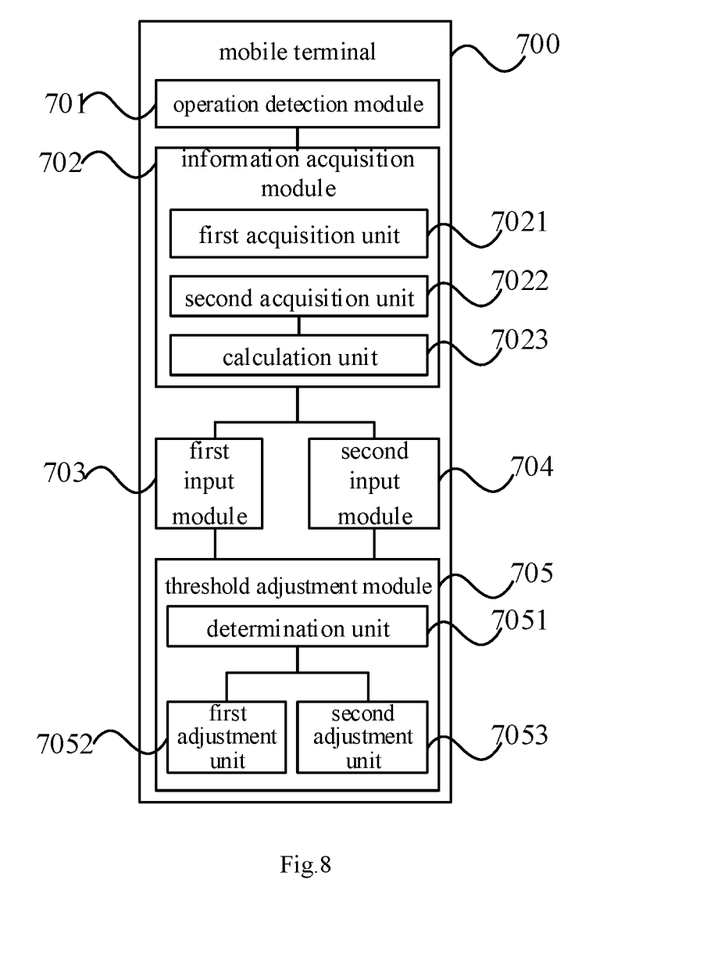
FIG. 8 is another block diagram of the mobile terminal according to one embodiment of the present disclosure.

In a possible embodiment of the present disclosure, as shown in FIG. 8, the mobile terminal 700 may further include a threshold adjustment module 705 configured to adjust the predetermined threshold in accordance with a next word editing operation performed after each pressing operation.

In a possible embodiment of the present disclosure, as shown in FIG. 8, the threshold adjustment module 705 may include: a determination unit 7051 configured to determine whether the next word editing operation performed after each pressing operation is a cancelling operation; a first adjustment unit 7052 configured to, when the next word editing operation performed after each pressing operation is the cancelling operation, record the pressure detection value for the pressing operation, and determine an average of the recorded pressure detection values as an adjusted threshold when the times of recording the pressure detection values reach a predetermined value; and a second adjustment unit 7053 configured to, when the next word editing operation performed after each pressing operation is not the cancelling operation, maintain the predetermined threshold.

In a possible embodiment of the present disclosure, when the touch panel is a pressure sensitive touch panel, as shown in FIG. 8, the information acquisition module 702 may include a first acquisition unit 7021 configured to acquire the pressure detection value for the pressing operation detected by the pressure sensitive touch panel.

In a possible embodiment of the present disclosure, when the mobile terminal is provided with a barometer arranged below the touch panel, as shown in FIG. 8, the information acquisition module 702 may include: a second acquisition unit 7022 configured to acquire a first atmospheric pressure value in an internal cavity of the mobile terminal detected by the barometer before the touch panel is pressed, and a second atmospheric pressure value in the internal cavity of the mobile terminal detected by the barometer when the touch panel is being pressed; and a calculation unit 7023 configured to calculate a difference between the second atmospheric pressure value and the first atmospheric pressure value, and take the difference as the pressure detection value for the pressing operation.

In a possible embodiment of the present disclosure, when the first-type characters include more than one character, the first input module 703 is further configured to display the characters included in the first-type characters at a first predetermined region, and input a character selected by the user at the first predetermined region into the predetermined word editable region. When the second-type characters include more than one character, the second input module 704 is further configured to display the characters included in the second-type characters at a second predetermined region, and input a character selected by the user at the second predetermined region into the predetermined word editable region.

According to the embodiments of the present disclosure, when the keyboard for inputting the characters is displayed on the display panel of the mobile terminal, the operation detection module 701 may detect the pressing operation made by the user on the touch panel of the mobile terminal at the display region of the keyboard. When the pressing operation has been detected, the information acquisition module 702 may acquire the pressure detection value for the pressing operation and the target key on which the pressing operation is performed. When the pressure detection value is greater than the predetermined threshold, the first input module 703 may select one character from the first-type characters corresponding to the target key and then input the selected character into the predetermined word editable region. When the pressure detection value is smaller than or equal to the predetermined threshold, the second input module 704 may select one character from the second-type characters corresponding to the target key and then input the selected character into the predetermined word editable region.

In the embodiments of the present disclosure, the type of characters corresponding to the target key may be determined by the user through changing a pressure for the pressing operation made on the touch panel of the mobile terminal. Regardless of the pressure for the pressing operation, the pressing operation may be performed rapidly. In addition, when it is necessary to switch the types of the characters, it is merely necessary to change the pressure for the pressing operation, without any other additional operation. As a result, it is able to solve such problems as being time-consuming, complex and less-efficient occur in the conventional input methods when some characters are inputted, thereby to input the characters efficiently.

Figure 9:
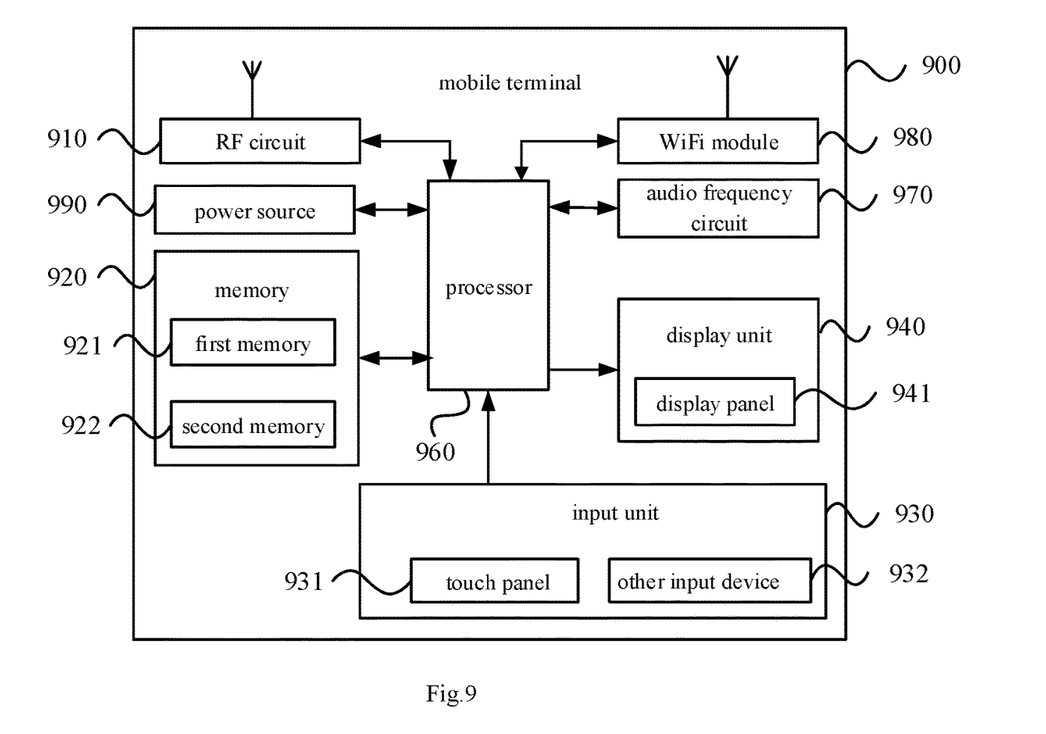
FIG. 9 is yet another block diagram of the mobile terminal according to one embodiment of the present disclosure.

As shown in FIG. 9, the present disclosure further provides in some embodiments a mobile terminal 900. The mobile terminal 900 may be a mobile phone, a flat-panel computer, a Personal Digital Assistant (PDA) or a vehicle-mounted computer.

The mobile terminal 900 may include a Radio Frequency (RF) circuit 910, a memory 920, an input unit 930, a display unit 940, a processor 960, an audio frequency circuit 970, a Wireless Fidelity (WiFi) module 980 and a power source 990.

The input unit 930 is configured to receive digital or character information inputted by a user, and generate a signal input related to user settings and function control of the mobile terminal 900. To be specific, the input unit 930 may include a touch panel 931. The touch panel 931, also called as touch screen, is configured to collect a touch operation made by the user on or in proximity to the touch panel (e.g., an operation made by the user through any appropriate object or attachment (e.g., finger or stylus) on or in the proximity to the touch panel 931), and drive a corresponding connection device in accordance with a preset program.

In a possible embodiment of the present disclosure, the touch panel 931 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 960, and receive and execute a command from the processor 960. In addition, the touch panel 931 may be of a resistive type, a capacitive type, an infrared type or a surface acoustic wave (SAW) type. Apart from the touch panel 931, the input unit 930 may further include an input device 932 which may include, but not limited to, a physical keyboard, a functional button (e.g., a volume control button or an on/off button), a trackball, a mouse, and a joystick, which will not be particularly defined herein.

The display unit 940 is configured to display information inputted by the user or information to be presented to the user, and various interfaces for the mobile terminal 900, and it may include a display panel 941. In a possible embodiment of the present disclosure, the display panel 941 may be a Liquid Crystal Display (LCD) panel or an Organic Light-Emitting Diode (OLED) panel.

It should be appreciated that, the touch panel 931 may cover the display panel 941, so as to form a touch display panel. When the touch operation made on or in proximity to the touch display panel has been detected, the touch information may be transmitted to the processor 960 so as to determine a type of a touch event. Then, the processor 960 may provide corresponding visual output on the touch display panel in accordance with the type of the touch event.

The touch display panel may include an application interface display region and a commonly-used widget display region. An arrangement mode of the two display regions will not be particularly defined herein, e.g., one of the two display regions may be arranged above or under the other, or arranged to the left or the right of the other. The application interface display region may be adopted to display interfaces for applications, and each interface may include an icon for at least one application and/or an interface element such as desktop widget. The application interface display region may also be a blank interface where no content is contained. The commonly-used widget display region may be adopted to display widgets which are used frequently, e.g., setting button, interface serial number, scroll bar, or such application icons as telephone book icon.

The processor 960 may be a control center of the mobile terminal 900, and connected to each member of the entire UE via various interfaces and lines. The processor 960 is configured to run or execute software programs and/or modules stored in a first memory 921, and call data stored in a second memory 922, so as to achieve various functions of the mobile terminal 900, and process the data, thereby to monitor the mobile terminal 900. In a possible embodiment of the present disclosure, the processor 960 may include one or more processing units.

In a possible embodiment of the present disclosure, the processor 960 is configured to: when a keyboard for inputting characters is displayed on a display panel of a mobile terminal, detect a pressing operation made by a user on a touch panel of the mobile terminal at a display region of the keyboard; when the pressing operation has been detected, acquire a pressure detection value for the pressing operation and a target key on which the pressing operation is performed; when the pressure detection value is greater than a predetermined threshold, select one character from the first-type characters corresponding to the target key and input the selected character into a predetermined word editable region; and when the pressure detection value is smaller than or equal to the predetermined threshold, select one character from the second-type characters corresponding to the target key and input the selected character into the predetermined word editable region. The characters corresponding to the target key may include first-type characters and second-type characters, and each of the first-type characters and the second-type characters may include at least one character.

In a possible embodiment of the present disclosure, subsequent to selecting one character from the first-type characters corresponding to the target key and inputting the selected character into the predetermined word editable region and subsequent to selecting character from the second-type characters corresponding to the target key and input the selected character into the predetermined word editable region, the processor 960 is further configured to adjust the predetermined threshold in accordance with a next word editing operation performed after each pressing operation.

In a possible embodiment of the present disclosure, the processor 960 is further configured to: determine whether the next word editing operation performed after each pressing operation is a cancelling operation; when the next word editing operation performed after each pressing operation is the cancelling operation, record the pressure detection value for the pressing operation, and determine an average of the recorded pressure detection values as an adjusted threshold when the times of recording the pressure detection values reach a predetermined value; and when the next word editing operation performed after each pressing operation is not the cancelling operation, maintain the predetermined threshold.

In a possible embodiment of the present disclosure, when the touch panel is a pressure sensitive touch panel, the processor 960 is further configured to acquire the pressure detection value for the pressing operation detected by the pressure sensitive touch panel.

In a possible embodiment of the present disclosure, when the mobile terminal is provided with a barometer arranged below the touch panel, the processor 960 is further configured to: acquire a first atmospheric pressure value in an internal cavity of the mobile terminal detected by the barometer before the touch panel is pressed, and a second atmospheric pressure value in the internal cavity of the mobile terminal detected by the barometer when the touch panel is being pressed; and calculate a difference between the second atmospheric pressure value and the first atmospheric pressure value, and take the difference as the pressure detection value for the pressing operation.

In a possible embodiment of the present disclosure, when the first-type characters include more than one character, the processor 960 is further configured to display the characters included in the first-type characters at a first predetermined region, and input a character selected by the user at the first predetermined region into the predetermined word editable region. When the second-type characters include more than one character, the processor 960 is further configured to display the characters included in the second-type characters at a second predetermined region, and input a character selected by the user at the second predetermined region into the predetermined word editable region.

The mobile terminal 900 is capable of implementing the procedures mentioned hereinabove, which will thus not be particularly defined herein.

According to the mobile terminal 900 in the embodiments of the present disclosure, when the keyboard for inputting the characters is displayed on the display panel of the mobile terminal, the pressing operation made by the user on the touch panel of the mobile terminal at the display region of the keyboard may be detected. When the pressing operation has been detected, the pressure detection value for the pressing operation and the target key on which the pressing operation is performed may be acquired. When the pressure detection value is greater than the predetermined threshold, one character may be selected from the first-type characters corresponding to the target key and then inputted into the predetermined word editable region. When the pressure detection value is smaller than or equal to the predetermined threshold, one character may be selected from the second-type characters corresponding to the target key and then inputted into the predetermined word editable region. In the embodiments of the present disclosure, the type of characters corresponding to the target key may be determined by the user through changing a pressure for the pressing operation made on the touch panel of the mobile terminal. Regardless of the pressure for the pressing operation, the pressing operation may be performed rapidly. In addition, when it is necessary to switch the types of the characters, it is merely necessary to change the pressure for the pressing operation, without any other additional operation. As a result, it is able to solve such problems as being time-consuming, complex and less-efficient occur in the conventional input methods when some characters are inputted, thereby to input the characters efficiently.

Figure 10:
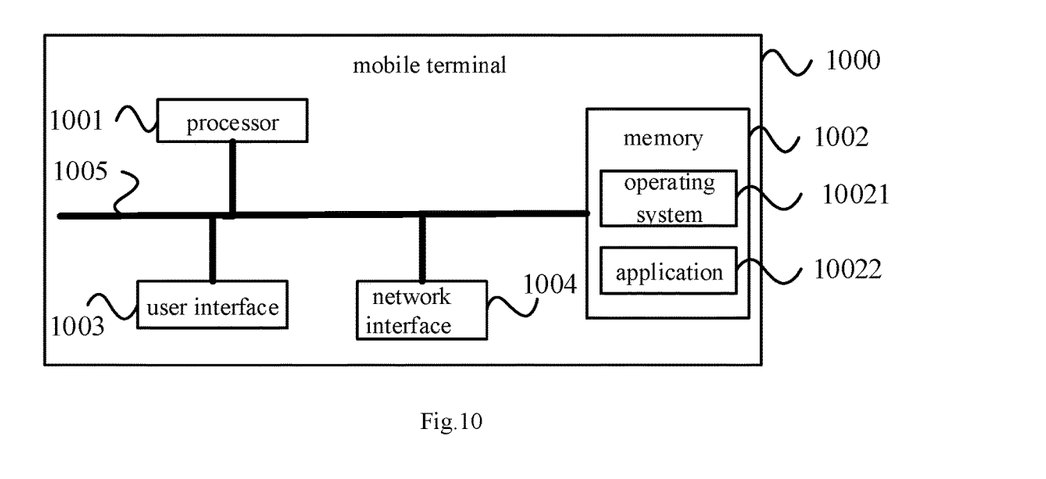
FIG. 10 is still yet another block diagram of the mobile terminal according to one embodiment of the present disclosure.

As shown in FIG. 10, the present disclosure further provides in some embodiments a mobile terminal 1000. The mobile terminal 1000 may be a mobile phone, a flat-panel computer, a PDA, or a vehicle-mounted computer.

The mobile terminal 1000 may include at least one processor 1001, a memory 1002, at least one network interface 1004, and a user interface 1003. The components of the mobile terminal 1000 may be coupled together through a bus system 1005. It should be appreciated that, the bus system 1005 is configured to achieve connection and communication among the components. Apart from a data bus, the bus system 1005 may further include a power source bus, a control bus and a state signal bus. For clarification, all these buses in FIG. 10 may be collectedly called as bus system 1005.

The user interface 1003 may include a display, a keyboard or a pointing device (e.g., mouse, track ball, touch plate or touch panel).

It should be appreciated that, the memory 1002 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 1002 intends to include, but not limited to, the above-mentioned and any other appropriate memories.

In a possible embodiment of the present disclosure, the following elements may be stored in the memory 1002: an executable module or data structure, a subset or an extended set thereof, an operating system 10021 and an application 10022.

The operating system 10021 may include various system programs, e.g., a framework layer, a core layer and a driving layer, so as to implement various basic services and process hardware-based tasks. The application 10022 may include various applications, e.g., Media Player and Browser, so as to implement various application services. The programs for implementing the above-mentioned method may be included in the application 10022.

In a possible embodiment of the present disclosure, the processor 1001 is configured to: when a keyboard for inputting characters is displayed on a display panel of a mobile terminal, detect a pressing operation made by a user on a touch panel of the mobile terminal at a display region of the keyboard; when the pressing operation has been detected, acquire a pressure detection value for the pressing operation and a target key on which the pressing operation is performed; when the pressure detection value is greater than a predetermined threshold, select one character from the first-type characters corresponding to the target key and input the selected character into a predetermined word editable region; and when the pressure detection value is smaller than or equal to the predetermined threshold, select one character from the second-type characters corresponding to the target key and input the selected character into the predetermined word editable region. The characters corresponding to the target key may include first-type characters and second-type characters, and each of the first-type characters and the second-type characters may include at least one character.

The above-mentioned method may be applied to, or implemented by, the processor 1001. The processor 1001 may be an integrated circuit (IC) having a signal processing capability. During the implementation, the steps of the above-mentioned method may be completed through an integrated logic circuit of hardware in the processor 1001 or instructions in the form of software. The processor 1001 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 1002, and the processor 1001 may read information stored in the memory 1002 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

In a possible embodiment of the present disclosure, subsequent to selecting one character from the first-type characters corresponding to the target key and inputting the selected character into the predetermined word editable region and subsequent to selecting character from the second-type characters corresponding to the target key and input the selected character into the predetermined word editable region, the processor 1001 is further configured to adjust the predetermined threshold in accordance with a next word editing operation performed after each pressing operation.

In a possible embodiment of the present disclosure, the processor 1001 is further configured to: determine whether the next word editing operation performed after each pressing operation is a cancelling operation; when the next word editing operation performed after each pressing operation is the cancelling operation, record the pressure detection value for the pressing operation, and determine an average of the recorded pressure detection values as an adjusted threshold when the times of recording the pressure detection values reach a predetermined value; and when the next word editing operation performed after each pressing operation is not the cancelling operation, maintain the predetermined threshold.

In a possible embodiment of the present disclosure, when the touch panel is a pressure sensitive touch panel, the processor 1001 is further configured to acquire the pressure detection value for the pressing operation detected by the pressure sensitive touch panel.

In a possible embodiment of the present disclosure, when the mobile terminal is provided with a barometer arranged below the touch panel, the processor 1001 is further configured to: acquire a first atmospheric pressure value in an internal cavity of the mobile terminal detected by the barometer before the touch panel is pressed, and a second atmospheric pressure value in the internal cavity of the mobile terminal detected by the barometer when the touch panel is being pressed; and calculate a difference between the second atmospheric pressure value and the first atmospheric pressure value, and take the difference as the pressure detection value for the pressing operation.

In a possible embodiment of the present disclosure, when the first-type characters include more than one character, the processor 1001 is further configured to display the characters included in the first-type characters at a first predetermined region, and input a character selected by the user at the first predetermined region into the predetermined word editable region. When the second-type characters include more than one character, the processor 1001 is further configured to display the characters included in the second-type characters at a second predetermined region, and input a character selected by the user at the second predetermined region into the predetermined word editable region.

The mobile terminal 1000 is capable of implementing the procedures mentioned hereinabove, which will thus not be particularly defined herein.

According to the mobile terminal 1000 in the embodiments of the present disclosure, when the keyboard for inputting the characters is displayed on the display panel of the mobile terminal, the pressing operation made by the user on the touch panel of the mobile terminal at the display region of the keyboard may be detected. When the pressing operation has been detected, the pressure detection value for the pressing operation and the target key on which the pressing operation is performed may be acquired. When the pressure detection value is greater than the predetermined threshold, one character may be selected from the first-type characters corresponding to the target key and then inputted into the predetermined word editable region. When the pressure detection value is smaller than or equal to the predetermined threshold, one character may be selected from the second-type characters corresponding to the target key and then inputted into the predetermined word editable region. In the embodiments of the present disclosure, the type of characters corresponding to the target key may be determined by the user through changing a pressure for the pressing operation made on the touch panel of the mobile terminal. Regardless of the pressure for the pressing operation, the pressing operation may be performed rapidly. In addition, when it is necessary to switch the types of the characters, it is merely necessary to change the pressure for the pressing operation, without any other additional operation. As a result, it is able to solve such problems as being time-consuming, complex and less-efficient occur in the conventional input methods when some characters are inputted, thereby to input the characters efficiently.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are merely for illustrative purposes, but shall not be construed as limiting the scope of the present disclosure. Any person skilled in the art may make modifications and substitutions without departing from the spirit of the present disclosure, and these modifications and substitutions shall also fall within the scope of the present disclosure. Hence, the scope of the present disclosure shall be subject to the scope defined by the appended claims.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A character inputting method, comprising:
   detecting a pressing operation made by a user on a touch panel of a mobile terminal at a display region of a keyboard when the keyboard for inputting characters is displayed on the display panel of the mobile terminal;
   acquiring a pressure detection value for the pressing operation and a target key on which the pressing operation is performed when the pressing operation has been detected, characters corresponding to the target key comprising first-type characters and second-type characters, and each of the first-type characters and the second-type characters comprising at least one character;
   selecting one character from the first-type characters corresponding to the target key and inputting the selected character into a predetermined word editable region when the pressure detection value is greater than a predetermined threshold;
   selecting one character from the second-type characters corresponding to the target key and inputting the selected character into the predetermined word editable region when the pressure detection value is smaller than or equal to the predetermined threshold; and
   adjusting the predetermined threshold in accordance with a next word editing operation performed after each pressing operation,
   wherein:
      adjusting the predetermined threshold in accordance with the next word editing operation performed after each pressing operation comprises:
         determining whether the next word editing operation performed after each pressing operation is a cancelling operation;
         recording, when the next word editing operation performed after each pressing operation is the cancelling operation, the pressure detection value for the pressing operation, and determining an average of the recorded pressure detection values as an adjusted threshold when the times of recording the pressure detection values reach a predetermined value; and
         maintaining the predetermined threshold when the next word editing operation performed after each pressing operation is not the cancelling operation, and
   when the mobile terminal is provided with a barometer arranged below the touch panel, the acquiring the pressure detection value for the pressing operation comprises:
      acquiring a first atmospheric pressure value in an internal cavity of the mobile terminal detected by the barometer before the touch panel is pressed, and a second atmospheric pressure value in the internal cavity of the mobile terminal detected by the barometer when the touch panel is being pressed; and
      calculating a difference between the second atmospheric pressure value and the first atmospheric pressure value, and takinq the difference as the pressure detection value for the pressing operation.

2. The character inputting method according to claim 1, wherein the touch panel is a pressure sensitive touch panel, the acquiring the pressure detection value for the pressing operation comprises acquiring the pressure detection value for the pressing operation detected by the pressure sensitive touch panel.

3. The character inputting method according to claim 1, wherein:
   when the first-type characters comprise more than one character, the selecting one character from the first-type characters corresponding to the target key and inputting the selecting character into the predetermined word editable region comprises displaying the characters comprised in the first-type characters at a first predetermined region, and
   inputting a character selected by the user at the first predetermined region into the predetermined word editable region; and when the second-type characters comprise more than one character, the selecting one character from the second-type characters corresponding to the target key and inputting the selecting character into the predetermined word editable region comprises displaying the characters comprised in the second-type characters at a second predetermined region, and inputting a character selected by the user at the second predetermined region into the predetermined word editable region.

4. A mobile terminal, comprising a memory, a processor and a computer program stored on the memory and executable on the processor, so as to implement the steps of:
   detecting a pressing operation made by a user on a touch panel of a mobile terminal at a display region of a keyboard when the keyboard for inputting characters is displayed on the display panel of the mobile terminal;
   acquiring a pressure detection value for the pressing operation and a target key on which the pressing operation is performed when the pressing operation has been detected, characters corresponding to the target key comprising first-type characters and second-type characters, and each of the first-type characters and the second-type characters comprising at least one character; selecting one character from the first-type characters corresponding to the target key and inputting the selected character into a predetermined word editable region when the pressure detection value is greater than a predetermined threshold; selecting one character from the second-type characters corresponding to the target key and inputting the selected character into the predetermined word editable region when the pressure detection value is smaller than or equal to the predetermined threshold; and adjusting the predetermined threshold in accordance with a next word editing operation performed after each pressing operation, wherein: adjusting the predetermined threshold in accordance with the next word editing operation performed after each pressing operation comprises:

determining whether the next word editing operation performed after each pressing operation is a cancelling operation; recordinq, when the next word editinq operation performed after each pressing operation is the cancelling operation, the pressure detection value for the pressing operation, and determining an average of the recorded pressure detection values as an adjusted threshold when the times of recording the pressure detection values reach a predetermined value; and maintaining the predetermined threshold when the next word editing operation performed after each pressing operation is not the cancelling operation, and the mobile terminal is provided with a barometer arranged below the touch panel, the acquiring the pressure detection value for the pressing operation comprises: acquiring a first atmospheric pressure value in an internal cavity of the mobile terminal detected by the barometer before the touch panel is pressed, and a second atmospheric pressure value in the internal cavity of the mobile terminal detected by the barometer when the touch panel is being pressed; and calculating a difference between the second atmospheric pressure value and the first atmospheric pressure value, and taking the difference as the pressure detection value for the pressing operation.

5. The mobile terminal according to claim 4, wherein the touch panel is a pressure sensitive touch panel, the processor is configured to acquire the pressure detection value for the pressing operation detected by the pressure sensitive touch panel.

6. The mobile terminal according to claim 4, wherein: when the first-type characters comprise more than one character, the processor is further configured to display the characters comprised in the first-type characters at a first predetermined region, and input a character selected by the user at the first predetermined region into the predetermined word editable region; and when the second-type characters comprise more than one character, the processor is further configured to display the characters comprised in the second-type characters at a second predetermined region, and input a character selected by the user at the second predetermined region into the predetermined word editable region.

* * * * *